US005328543A

United States Patent [19]

Campagna

[11] Patent Number: 5,328,543

[45] Date of Patent: Jul. 12, 1994

[54] BORDER GUIDE

[75] Inventor: Thomas G. Campagna, 3 Wayside Ln., Selden, N.Y. 11784

[73] Assignee: Thomas G. Campagna, Selden, N.Y.

[21] Appl. No.: 763,284

[22] Filed: Oct. 21, 1991

[51] Int. Cl.[5] .............. B32B 31/00

[52] U.S. Cl. .............. 156/574; 156/577; 156/579

[58] Field of Search .............. 156/71, 574, 576, 577, 156/579; 206/409; 7/105

[56] References Cited

U.S. PATENT DOCUMENTS

| | | | |
|---|---|---|---|
| 701,727 | 6/1902 | Holmes | 156/577 |
| 3,574,042 | 4/1971 | McMullen et al. | 156/577 |
| 3,737,360 | 6/1973 | Horn | 156/581 X |
| 4,166,589 | 9/1979 | Hoover et al. | 53/441 X |
| 4,253,905 | 3/1981 | Regan | 156/577 X |
| 4,913,766 | 4/1990 | Löjdström | 156/574 X |
| 4,956,908 | 9/1990 | Morse et al. | 206/409 X |

*Primary Examiner*—David A. Simmons
*Assistant Examiner*—James J. Engel, Jr.

[57] ABSTRACT

A method of applying border paper to the ceiling line of walls using a border paper guide having a circular panel at the bottom side of which is mounted an extension pole, and at the upper side of which is mounted a cylindrical housing. The housing of the border guide is leaned against the wall at the desired height by resting the extension pole against the floor. After ascending a ladder, border is payed out from the housing by holding the part of the border extending through the slot in one hand, and then placing the pole about arms-length away with the other hand. With the housing suspending the border paper, both hands are free to apply the borders.

1 Claim, 2 Drawing Sheets

BORDER GUIDE

BACKGROUND OF THE INVENTION

This invention relates to a method of applying rolled border paper to the ceiling line of walls using a specially designed border guide which permits one to use both hands exclusively to apply the border paper.

DESCRIPTION OF THE PRIOR ART

Various prior art border paper and wallpaper hanging devices using roller applicators have been used in the past. Typically application is performed using a vertical motion. Heinemann illustrates such a vertical motion in U.S. Pat. No. 302,250. Shock (U.S. Pat. No. 308,382) discloses a rubber roller applicator for a hanging device. U.S. Pat. Nos. 3,737,360 and 3,861,988 to Horn and Preisler respectively, disclose devices for dispensing and applying self-adhesive materials. Holland (U.S. Pat. No. 3,979,242) discloses a pasting machine using a series of rollers, and Barbe (U.S. Pat. No. 4,711,682) discloses a machine including a soaking basin for applying pre-cut and pre-pasted sheets.

There are also prior art applicators for applying webs in a horizontal motion such as in U.S. Pat. No. 1,911,908 to Hoyos disclosing an auto body striping machine. Raber (U.S. Pat. No. 2,927,710) discloses a tape dispenser for tapes such as Scotch-tape. U.S. Pat. No. 4,166,589 to Hoover discloses a portable wrapping film machine for packaging. An apparatus for masking surfaces used to mask areas in preparation for spray painting is shown in U.S. Pat. No. 4,263,347 to Banta. Gable (U.S. Pat. No. 4,290,842) discloses a felt paper roller used in roofing.

SUMMARY OF THE INVENTION

The invention is a method of applying border paper to the ceiling line of walls using a border paper guide having a circular panel at the bottom side of which is mounted an extension pole, and at the upper side of which is mounted a cylindrical housing. The housing has at least one slot running perpendicular to the circular panel. Also, a shaft is mounted to the center of the upper side of the circular panel so that the shaft runs substantially the length of the cylindrical housing along the axis of the housing.

The user places rolled border paper around the shaft and within the housing, and suspends the border paper roll within the housing to the ceiling line of a wall by resting the extension pole against the floor. Border paper is payed out from the slot of the housing, and the border paper is then applied to the ceiling line of a wall using both hands. The advantage of using the method of this invention is that the border paper guide enables one to apply border paper with both hands. Additionally, the border paper will remain suspended throughout the application process.

DETAILED DESCRIPTION OF THE INVENTION

Figure 1:
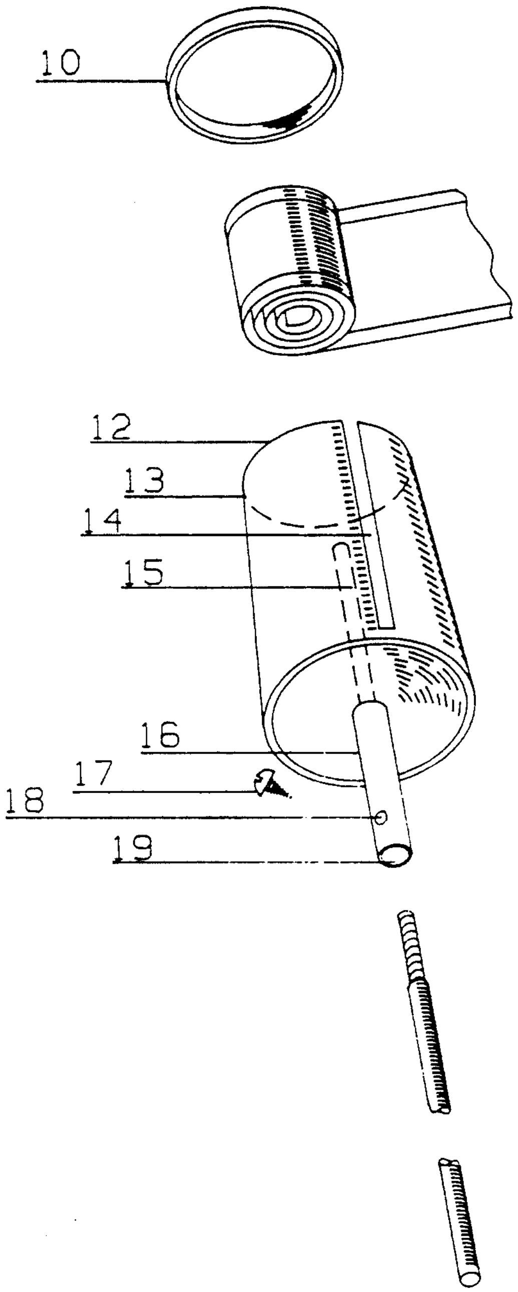
FIG. 1 depicts the border guide unassembled.
Figure 2:
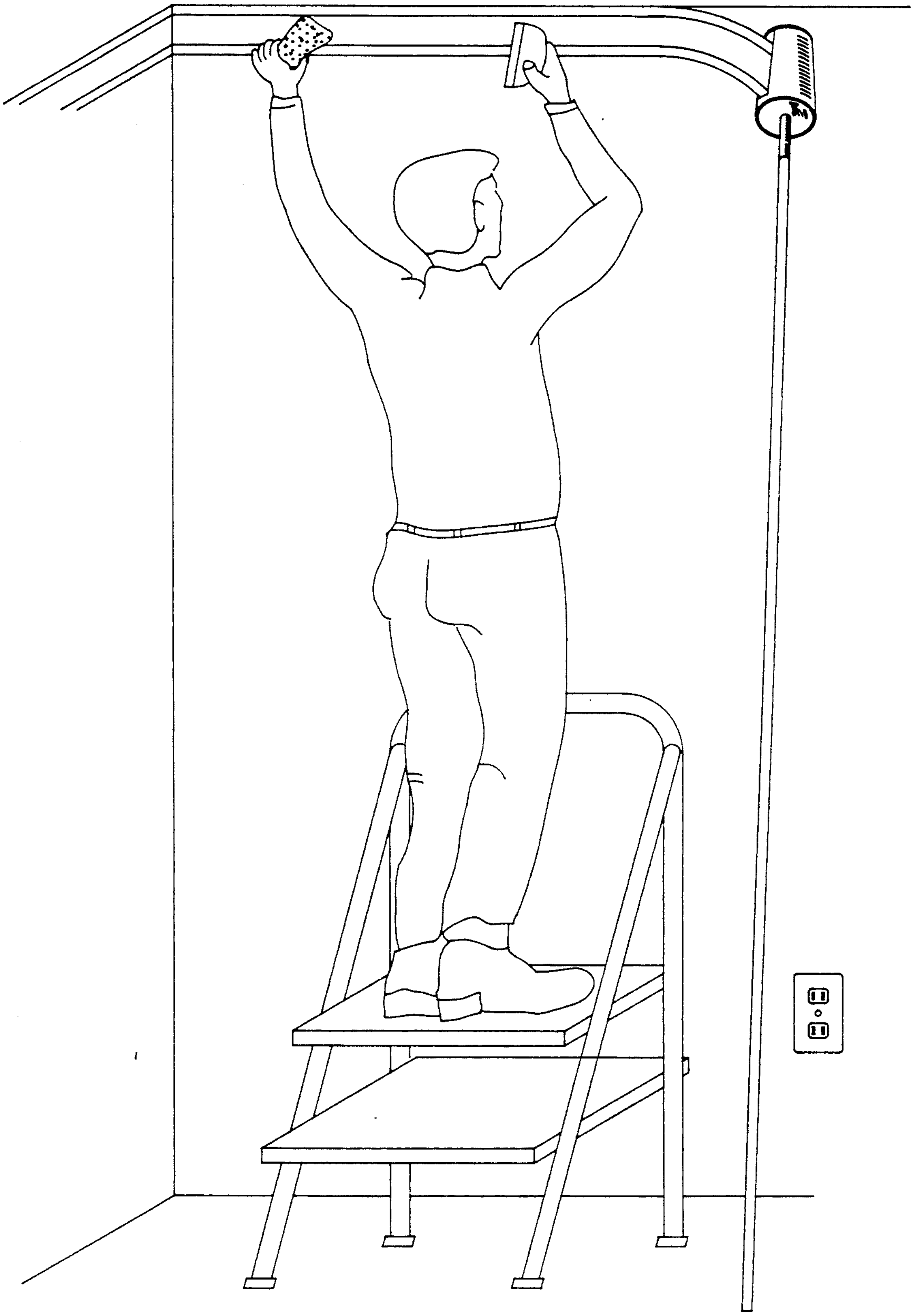
FIG. 2 is a drawing of a person using the border guide according to the method of this invention.

It is difficult to hand a border at ceiling height or any other height hard to reach. A person applying border paper has to make many moves up and down a ladder to complete a length of wall with a border. The border guide, with the assistance of an extension pole keeps the border at the desired height and location throughout the application process.

The border guide consists of a cylindrical housing 13 with a closed base in the form of a circular panel 20. A slot 14 runs down the cylindrical housing perpendicular to the circular panel. An extension pole 21 is mounted to the circular panel 20 by way of a base handle 16. The handle can be hand-held for application at lower heights, but the extension pole is advantageous when applying border paper at ceiling height. A screw 17 inserted through screw hole 18 can be used to more firmly secure the extension pole. A shaft 15 in the center of the housing 13 is used to steady the border. Border 11 is placed in the housing 13 around the shaft 15 with the starting end of the border extending through the slot 14. An o-ring 10 is snapped on to the lip 12 of the housing to firm the lip and to keep the slot open.

In the process according to the invention, the housing 13 of the border guide is leaned against the wall at the desired height by resting the extension pole against the floor. After ascending a ladder, border is payed out from the housing 13 by holding the part of the border extending through the slot 14 in one hand, and then placing the pole about arms-length away with the other hand. With the housing suspending the border paper, both hands are free to apply the border.

The border guide provides a means for handling any rolled material such as paper or cloth. For paperhangers it is an improvement over the conventional method. The use of the border guide eliminates the inconvenience of a border constantly falling while being applied at heights beyond arms-length. In addition to saving time, the method of using the border guide according to the invention eliminates the need of an assistant.

I claim:

1. A method of applying rolled border paper to the ceiling line of walls comprising the steps of:

a) providing a border paper guide including
   - a circular panel at the bottom side of which is mounted a extension pole;
   - a cylindrical housing mounted to the upper side of the circular panel at the periphery of said upper side, said housing having at least one slot running perpendicular to the circular panel; and
   - a shaft mounted to the center of the upper side of the circular panel, said shaft running substantially the length of the cylindrical housing along the axis of the housing;

b) placing rolled border paper around said shaft and within said housing;

c) suspending the border paper roll within said housing to the ceiling line of a wall by resting said extension pole against the floor; and d) applying border paper payed out from said slot of said housing to the ceiling line of a wall using both hands.

* * * * *